United States Patent
Rogers et al.

(10) Patent No.: US 8,415,972 B2
(45) Date of Patent: Apr. 9, 2013

(54) VARIABLE-WIDTH POWER GATING MODULE

(75) Inventors: Aaron S. Rogers, Pflugerville, TX (US); Daniel W. Bailey, Austin, TX (US); Eric Quinnell, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 12/948,596

(22) Filed: Nov. 17, 2010

(65) Prior Publication Data

US 2012/0119816 A1  May 17, 2012

(51) Int. Cl.
*H03K 17/16*  (2006.01)
(52) U.S. Cl.
USPC ............................................. 326/34
(58) Field of Classification Search ............. 326/31–34, 326/37–41, 47, 101, 80–87
See application file for complete search history.

(56) References Cited

U.S. PATENT DOCUMENTS

| | | | | |
|---|---|---|---|---|
| 5,073,727 | A * | 12/1991 | Shizu | 326/121 |
| 5,614,842 | A * | 3/1997 | Doke et al. | 326/58 |
| 5,726,946 | A * | 3/1998 | Yamagata et al. | 365/226 |
| 6,425,097 | B1 * | 7/2002 | Elachkar et al. | 714/43 |
| 7,667,484 | B2 * | 2/2010 | Tada | 326/33 |
| 7,755,396 | B2 * | 7/2010 | Shin et al. | 326/101 |
| 2003/0184343 | A1 * | 10/2003 | Kuge | 326/86 |
| 2004/0164763 | A1 * | 8/2004 | Kim et al. | 326/30 |
| 2010/0231044 | A1 * | 9/2010 | Tatsumi et al. | 307/39 |
| 2011/0148622 | A1 * | 6/2011 | Judy et al. | 340/539.12 |

* cited by examiner

*Primary Examiner* — Shawki Ismail
*Assistant Examiner* — Thienvu Tran
(74) *Attorney, Agent, or Firm* — Williams, Morgan & Amerson, P.C.

(57) ABSTRACT

A semiconductor device includes a primary voltage rail, a secondary voltage rail, a plurality of transistors coupled between the primary and secondary voltage rails, and control logic operable to enable a first subset of the plurality of transistors to couple the primary voltage rail to the secondary voltage rail. During a steady state condition, the first subset comprises less than all of the plurality of transistors.

37 Claims, 5 Drawing Sheets

VARIABLE-WIDTH POWER GATING MODULE

BACKGROUND

The disclosed subject matter relates generally to integrated circuit devices with sleep enabled power rails, and more particularly, a variable-width power gating module.

Secondary voltage rails are used in an integrated circuit device to selectively control the voltage supplied to one or more components of the device. For instance, an integrated circuit device may include one or more main power rails that provide power to the entire IC. The main power rail may be powered externally by either a battery or by a power supply directly connected to a power distribution service. When the device is turned on, power from the battery or the power supply connects to the integrated circuit device and charges the main power rail(s). Instead of connecting all of the integrated circuit device components to the main power rail, one or more components may be connected to a secondary voltage rail that is selectively switched on or off using a controllable switch.

This ability to selectively switch components on or off in an integrated circuit device is particularly important in handheld devices including, but not limited to, cell phones, personal digital assistants, portable entertainment systems, etc. In such devices, reducing the net power consumption of the device lengthens the amount of time between charges (or between replacements) of a battery power source. However, it is recognized that the selective ability to switch components on or off in an IC is also important to traditional computer systems that are not dependent upon a battery source. For instance, laptops are often designed to dissipate the least amount of heat so that the user is comfortable handling the system. It may further be valuable to reduce the net power consumed on a traditional computer system. It is further recognized that the physical size of an integrated circuit device and/or computer system, and the amount of operating noise associated with the device/system, may also decrease as the number and size of heat sinks and fans is reduced.

Conventionally, one or more switches in an integrated circuit device are used to selectively switch a voltage rail on or off, thereby selectively powering up or down components connected to the voltage rail. In this manner, the multiple voltage rails may serve to create voltage domains by dividing an integrated circuit device into voltage islands. In some integrated circuit devices, more than one voltage rail may be provided, thereby creating multiple voltage islands, each operating at the same or different voltage levels. One or more voltage rails may operate at a different voltage level than the main power rail.

In conventional circuits, transistors may be used to implement the one or more switches that power up a given secondary voltage rail. These transistors may be collectively referred to as a power gating module. The power gating module is responsive to a sleep (i.e., enable) signal for selectively powering or isolating the secondary rail. For example, the secondary rail may be isolated to place at least a portion of the integrated circuit device into a sleep mode. The sleep signal may be generated by any suitable device located on or off the integrated circuit device. In one example, a state machine may be used to enable or disable the sleep mode responsive to a determination that a specific voltage island is required to perform a given task. In the event a given voltage island is not required to work or perform the given task, the state machine enables the sleep signal (i.e., it puts the voltage island to sleep). In the event a given voltage island is required to function, the state machine disables the sleep signal (i.e., it wakes up or powers up the island). Such sleep control may be implemented in a highly dynamic manner.

Conventionally, the effective width, or current carrying capacity of the power gating module is fixed. In some implementations, a plurality of substantially identical transistors are concurrently enabled or disabled, resulting in a relatively large instantaneous current draw from the primary rail and the associated noise (e.g., voltage fluctuations and IR drops) when the secondary rail is powered. The large current draw may also cause possible electromigration ("EM") violations due to the relatively large size of the PMOS transistors used in the power gating module. As known in the art, EM violations result when the current levels in a physical electronic connection are increased to the point where the connection physically breaks down and possibly burns. EM violations may occur from, for example, surpassing a maximum DC current, a maximum peak AC current, a maximum RMS AC current, etc.

To reduce the magnitude of the current fluctuation and to reduce the noise, a technique has been employed to stagger the enablement of the transistors in the power gating module using cascaded enable signals (i.e., the enable signal is delayed for some of the transistors). However, the overall width of the power gating module is not affected by the cascaded enable signal. Because, the power gating module effects the dynamic operation of the integrated circuit device, it has the potential to also affect the performance characteristics of the device, such as maximum frequency, minimum voltage, functionality (hold time), negative bias temperature instability degradation, high current conditions (contention/reset issues), interface timing, or other effects that may be attributed to a delta voltage on the supply. It is difficult for designers to gather information regarding whether the power gating module design is oversized or undersized. Hence, the sizing of the power gating module may negatively affect the performance grade of the device, and such degradation may be hard to quantify.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a semiconductor device including a primary voltage rail, a secondary voltage rail, a plurality of transistors coupled between the primary and secondary voltage rails, and control logic operable to enable a first subset of the plurality of transistors to couple the primary voltage rail to the secondary voltage rail. During a steady state condition, the first subset comprises less than all of the plurality of transistors.

Another aspect of the disclosed subject matter is seen in a method for characterizing a semiconductor device including a primary voltage rail, a secondary voltage rail, a plurality of transistors coupled between the primary and secondary voltage rails, and control logic operable to enable selected ones of the plurality of transistors to couple the primary voltage rail to the secondary voltage rail. The method includes setting a configuration of the control logic to enable a first subset of the transistors responsive to an enable signal, determining a performance parameter of the semiconductor device in the first configuration, iteratively changing the configuration to enable different subsets of the transistors and determining the performance parameter for the changed configurations to determine an effect of the configurations on the performance parameter, and setting the configuration to a selected configuration that optimizes the performance parameter.

Yet another aspect of the disclosed subject matter is seen in a reticle including a first die pattern for patterning a first interconnect structure of a first semiconductor device including a primary voltage rail, a secondary voltage rail, and a plurality of transistors coupled between the primary and secondary voltage rails. The first interconnect structure is associated with at least one of the primary or secondary voltage rails. The reticle includes a second die pattern disposed adjacent the first die pattern for patterning a second interconnect structure of a second semiconductor device including a primary voltage rail, a secondary voltage rail, and a plurality of transistors coupled between the primary and secondary voltage rails. The second interconnect structure defines a short circuit connection between the primary and secondary voltage rails.

Still another aspect of the disclosed subject matter is seen in a method that includes forming a first semiconductor device on a wafer. The first semiconductor device includes a first primary voltage rail, a first secondary voltage rail, and a first power gating module coupled between the first primary and secondary voltage rails. A second semiconductor device is formed on the wafer. The second semiconductor device includes a second primary voltage rail, a second secondary voltage rail, and a second power gating module coupled between the second primary and secondary voltage rails. The wafer is patterned to short the second primary voltage rail to the second secondary voltage rail.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
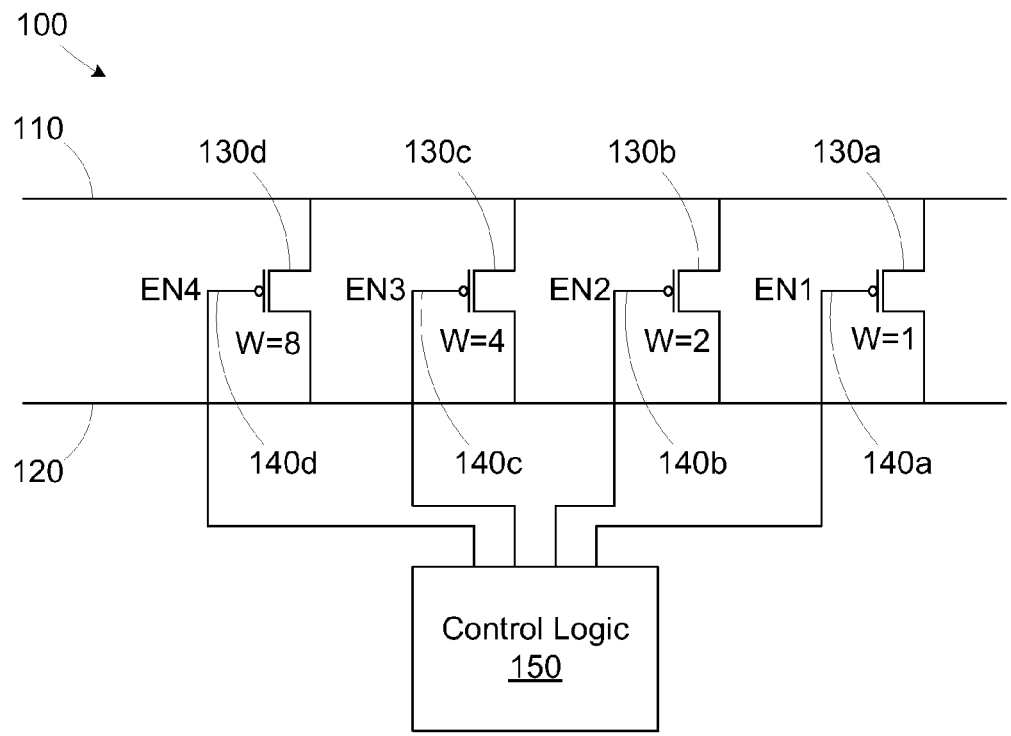
FIG. 1 is a simplified block diagram of a power gating module in accordance with one illustrative embodiment of the present invention.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a power gating module 100. The power gating module 100 couples a primary voltage rail 110 to a secondary voltage rail 120. The power gating module includes a plurality of transistors 130 (*a*-*d*), each enabled by a separate enable signal, EN(1-4), over an enable line 140(*a*-*d*) coupled to its gate terminal. Control logic 150 is provided for selectively enabling or disabling one or more of the plurality of transistors 130(*a*-*d*) to power or disable the secondary voltage rail 120. For example, the control logic 150 may implement sleep logic for powering down certain portions of a device including the power gating module 100 when portions of the circuit are unnecessary.

In the illustrated embodiment, the transistors 130(*a*-*d*) are PMOS devices that are enabled in response to a logic "0" being asserted at their gate terminals. Of course, the power gating module 100 may be implemented using a complementary NMOS design with a logic "1" assertion state. Also, in the illustrated embodiment, the primary and secondary rails 110, 120 operate using the same voltage level. However, mechanism(s) used to transform the voltage from the level provided on the first power rail 110 to a different voltage level on the secondary voltage rail 120 are known in the art. For ease of illustration, and to avoid obscuring the present subject matter, voltage transformations between the voltage rails 110, 120 will not be discussed or illustrated. Instead, each of the voltage rails 110, 120 discussed and illustrated in the present document is operational to provide the same voltage level (or, due to non-ideal components, nearly the same voltage level). It will further be appreciated by those of ordinary skill in the art that the added clarity provided by describing the subject matter with reference to the voltage rails 110, 120 having the same or similar voltages is not meant to limit or constrain the application of the present subject matter to only two such rails or to rails with the same or similar voltages.

In general, the plurality of transistors 130(*a*-*d*) allow the effective width of the power gating module 100 at steady state to be modulated. By enabling only a subset of the transistors 130(*a*-*d*), a range of widths for the power gating module 100 may be provided. The number of transistors 130(*a*-*d*) and their individual or collective effective widths may vary depending on the particular implementation and the degree of granularity desired. In the illustrated embodiment, the transistors 130(*a*-*d*) each have different widths so that each different combination of transistors 130(*a*-*d*) in the enabled subset has a different effective width. Because there are 4 transistors 130(*a*-*d*) in the illustrated embodiment, each counter increment represents 1/16 of the total width. In the illustrated embodiment, the transistors 130(*a*-*d*) may have widths corresponding to weights of 1, 2, 4, and 8. The weights are not meant to illustrate actual transistor widths, but rather the ratios between the transistor widths. The effective width of the power gating module 100 at steady state is thus determined by a "transistor width counter" value applied to the enable lines 140(*a*-*d*). For example, the cumulative effective width would correspond to the value of the binary counter value.

The granularity provided by the power gating module 100 allows the associated integrated circuit device to be tested with different effective widths to determine the effects of the width on performance characteristics of the device, such as maximum frequency, minimum voltage, etc. This characterization allows the determination of whether the power gating module 100 is over-sized, which means its wasting power while asleep, or if it is under-sized, which could be leaving chip maximum frequency or lower-voltage unexploited. Once, the optimal or desired effective width of the power gating module 100 is determined, the integrated circuit device can be configured (i.e., using the control logic 150) to set the appropriate counter value by fusing or setting a configuration register value.

Figure 2:
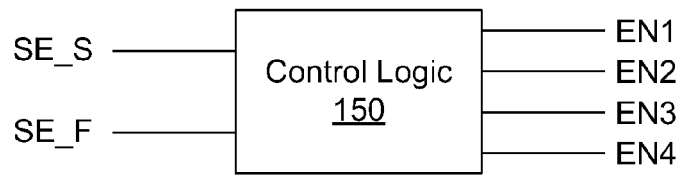
FIG. 2 is a simplified block diagram of control logic that may be employed in the module of FIG. 1.

The multiple transistors 130(*a*-*d*) may also be exploited to control the transient current during the powering-up of the secondary voltage rail 120 (i.e., when coming out of a sleep state). FIG. 2 illustrates an example control scheme whereby two global sleep enable signals are received by the control logic 150. The first sleep enable signal represents a slow wake-up signal, SE_S, and the second sleep enable signal represents a full wake-up signal, SE_F. The two global sleep enable signals may be separated by a predetermined time delay, or based on a monitored parameter of the secondary voltage rail 120. For example, the control logic 150 or other logic (not shown) may initiate a slow wake-up of the device by first enabling a low-width subset of the transistors 130(*a*-*d*) responsive to a slow wake assertion, followed by the full-width steady state subset (i.e., corresponding to the transistor width counter value) responsive to a full_wake assertion.

Figure 3:
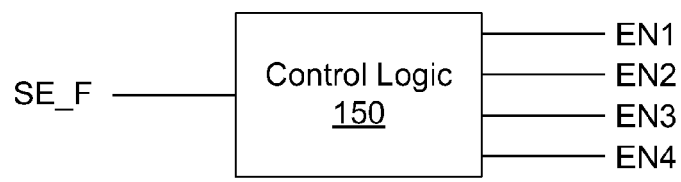
FIG. 3 is a simplified block diagram of alternative control logic that may be employed in the module of FIG. 1.

In another embodiment, shown in FIG. 3, the control logic 150 may receive a single global sleep enable signal. The control logic 150 may be configured (e.g., by fusing or control bits) to initiate a slow wake-up followed by a full wakeup at a later time. The control logic 150 may initiate the full wakeup after a predetermined time interval or by monitoring the voltage on the secondary voltage rail 130 and enabling the transistors 130(*a*-*d*) for the full wakeup after the voltage on the secondary voltage rail 120 exceeds a predetermined threshold.

Hence, in general, the control logic 150 may employ a first subset of the transistors 130(*a*-*d*) for a transient period, and a second, different subset of the transistors 130(*a*-*d*) for steady state operation. The granularity of the power gating module 100 also allows the tailoring of the transient response during the slow wake-up period. The control logic 150 may implement a slow wakeup in the embodiments of FIG. 2 or 3 by asserting those enable bits in the lowest weight bit positions that are asserted corresponding to the transistor width counter value, followed by the assertion of all bits in the transistor width counter value at steady state. If neither of the least significant bits is asserted, the control logic 150 may temporarily assert one or more of the least significant bits during the transient period and remove the assertions when the full transistor width counter value is asserted.

During the testing of the device, the characteristics of the slow wakeup interval may also be varied to determine the effects on device performance. If the slow wakeup is too slow, device speed may be affected, while if the slow wakeup is too fast, the transient current may be too high.

Figure 4:
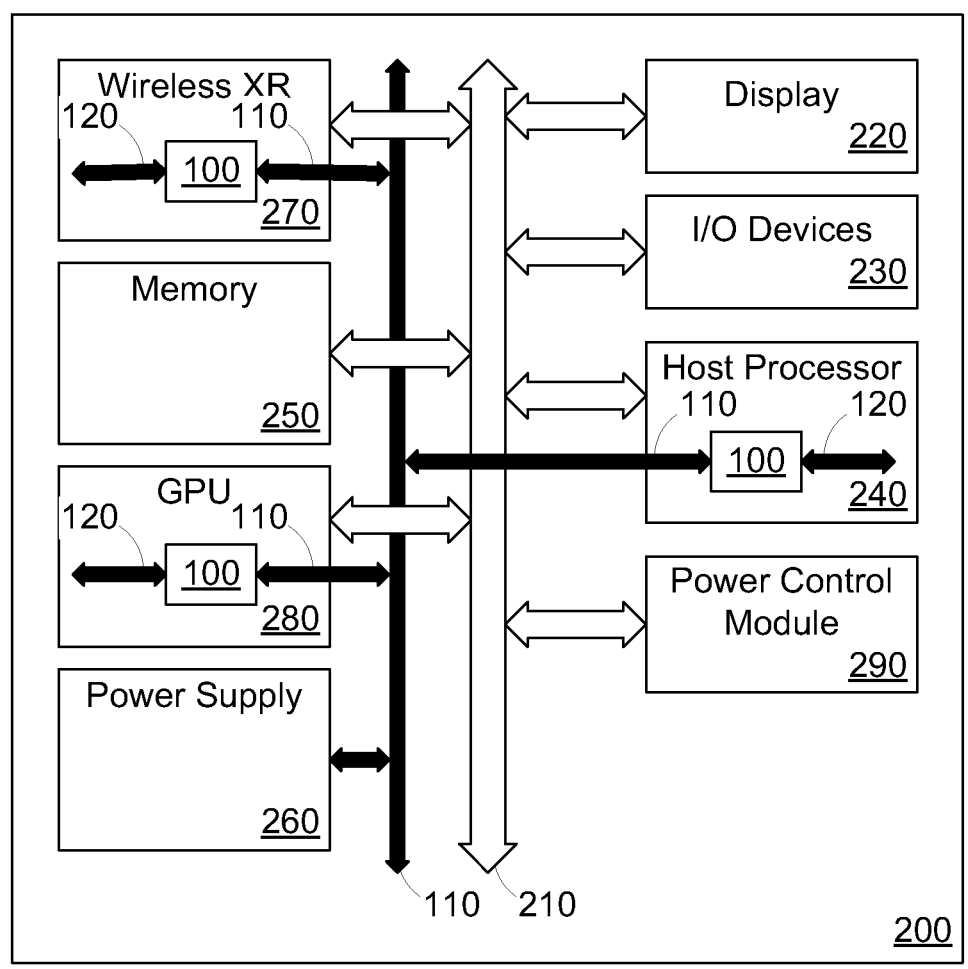
FIG. 4 is a simplified block diagram of a computer system employing the power gating module of FIG. 1.

Turning now to FIG. 4, a computer system 200 in which the power gating module 100 and or control logic 150 may be incorporated. As used herein, the computer system 200 may be any suitable device that processes digital data including but not limited to personal computers, handheld devices, workstations, etc. As illustrated, the computer system 200 may comprises a bus 210 such as any suitable bus, link, or combination of buses that is operable to convey information and data between the components of system 200. The computer system 200 may further include a display 220, one or more input/output devices 230, a host processor 240, memory 250, and a power supply 260. In one embodiment, computer system 200 may further include a wireless transceiver 270 and a multimedia or graphics processor (e.g., GPU) 280.

The display 220 may by any suitable display capable of visually reproducing information such as, but not limited to, an LCD or a CRT. The display 220 may be part of the physical system or may be externally coupled thereto. The input/output devices 230 may be any suitable devices capable of capturing command input from a user and/or capable of providing a user interface for capturing commands and providing feedback to the user (e.g., via audible or visual indicators). The input/output devices 230 may include, for example, a keyboard, a touchpad, or a mouse. The host processor 240 may be any suitable processor or processors such as, but not limited to, one or more of: a CPU, a broadband processor, a microprocessor, and a controller. The memory 250 may be any suitable memory or memories such as, but not limited to, flash memory, system memory, frame buffer memory, one or more mass storage devices, networked memory, or other remote memory. The memory 250 may be volatile or nonvolatile memory. Accordingly, the memory 250 may be implemented, for example, using one or more of the following technologies: RAM, DRAM, SRAM, SDRAM, PROM, EEPROM, CD-ROM, ROM, flash, etc. The wireless transceiver 270 may be any suitable transmitter/receiver capable of uploading and downloading broadcast signals from a service provider. The GPU 280 may be any type of media processor.

As illustrated, the system 200 also includes a power control module 290. The power control module 290 may control one or more of the devices in the system to affect sleep mode functionality. The power control module 290 may be a stand-alone circuit, such as an integrated circuit not directly associated with or integrated with the host processor 240 or the GPU 280. Accordingly, the power control module 290 may be part of an integrated circuit, an IC package, an ASIC, etc. In some embodiments, the control logic 150 described above may be implemented in the power control module 290, and thus, the sleep enable signals on the lines 140(*a-d*) may originate in the power control module 290. In other embodiments, the control logic 150 may be distributed to the sleep enabled components, and the power control module 290 may send a global sleep signal to the distributed control logic units 150, which would each control their own sets of lines 140(*a-d*) (e.g., as illustrated in FIGS. 2 and 3). In embodiments where multiple devices are sleep-enabled, each device may have its own unique steady state transistor width counter value and/or transient subset.

As illustrated, each of the components is generally coupled to the bus 210 to enable suitable communication between devices in the computer system 200 as understood in the art. The power supply 260, which may be a battery or a link to an AC power source, is coupled to provide power to at least the one or more devices in the system 200. More specifically, the power supply 260 is coupled to the main power supply rail 110 of each of the devices in the system 200. Thus, when the power control module 290, which may correspond to any suitable state machine or other device, generates a power control indicator or indicators to the individual devices, their respective power gating modules 100 may be enabled to provide power to the associated secondary voltage rails 120 to allow them to be selectively charged. The power control module 290 may, in one embodiment, generate the power control indicator based on a command from the host processor 240 or any other suitable processor.

The use of the power gating module 100 allows characterization of the device under different power gating conditions. However, to fully characterize the device in terms of the effects of the power gating module on performance, it is useful to have devices fabricated and characterized that have the power gating functionality bypassed. Disabling the power gating functionality may be achieved by shorting the main and secondary voltage rails 110, 120 in an upper metallization layer. By shorting the rails 110, 120, the device may be characterized without incurring any performance penalties due to power gating. In one embodiment, such characterization may be performed during an initial silicon testing phase for a new design.

One technique for shorting the rails 110, 120 could be to use a separate reticle to pattern the layer in which the shorting is to occur. However, the use of such a reticle would typically result in one normal wafer having functional power gating, while a wafer manufactured with the special reticle would have the rails 110, 120 shorted to one another. This approach introduces wafer-to-wafer variations in the silicon measurements.

Figure 5:
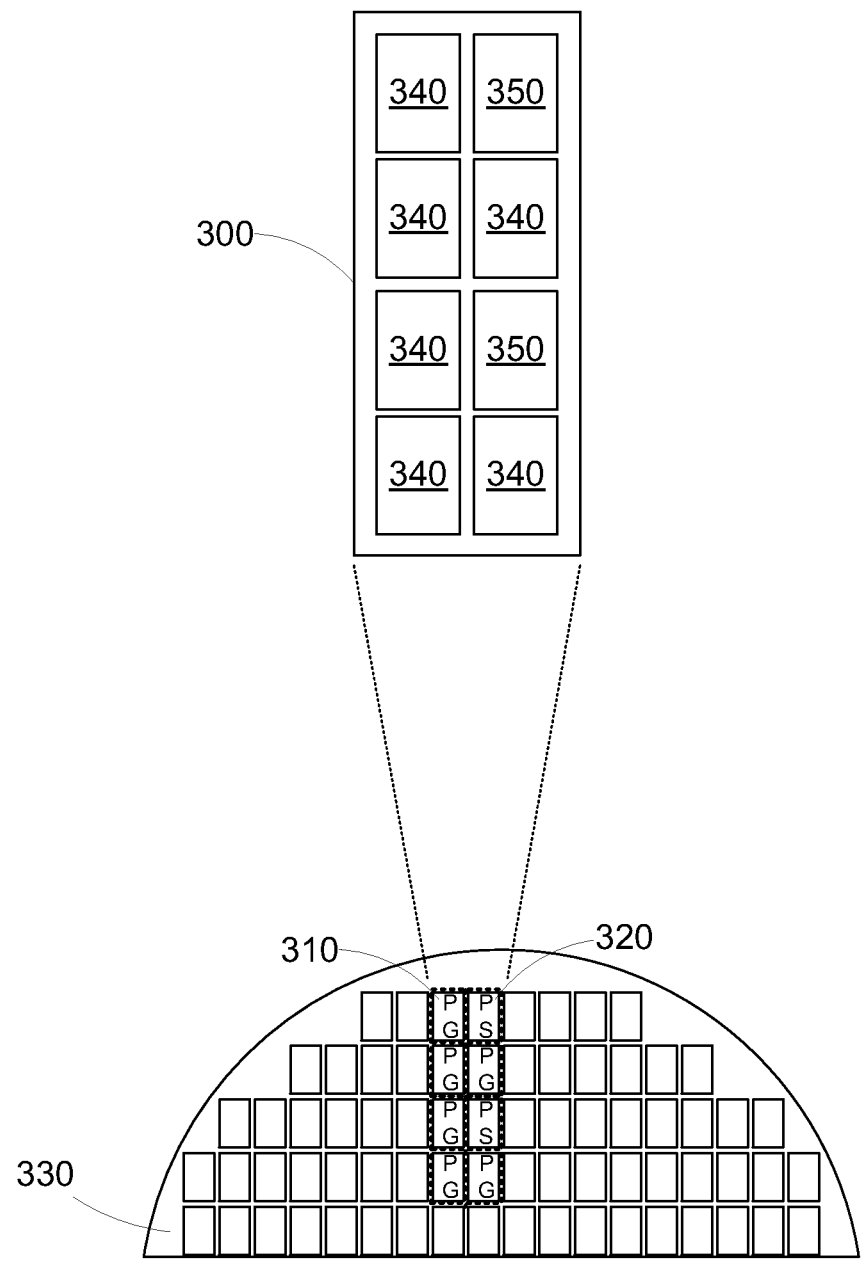
FIG. 5 is a simplified diagram of a reticle that may be used for patterning first devices with functional power gating modules and second devices with disabled power gating modules on the same wafer.

In accordance with another embodiment of the present invention, a reticle 300 shown in FIG. 5 may be used to fabricate a first set of power-gated devices (PG) 310 and a second set of power-gating-shorted devices (PS) 320 on the same wafer 330. Instead of generating an entirely new reticle to manufacture power-gating-shorted devices, the reticle 300 has one or more first die patterns 340 for manufacturing the power-gated devices 310, and one or more second die patterns 350 for manufacturing the power-gating-shorted devices 320. The total number of patterns 340, 350 on the reticle 300 may vary, and the number of die patterns 350 for manufacturing power-gating-shorted devices 320 may also vary depending on the particular implementation.

Figure 6:
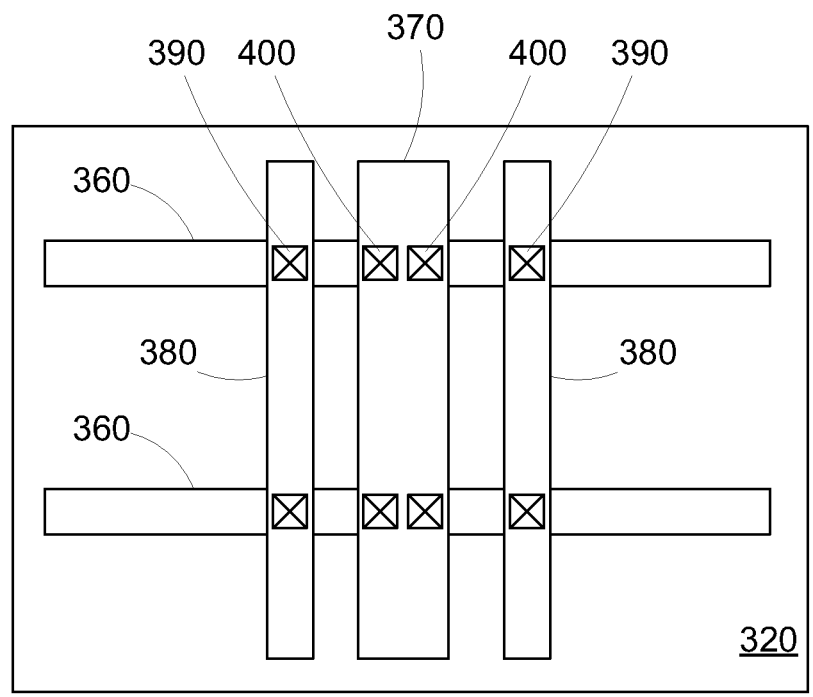
FIG. 6 is a top view of a semiconductor device patterned by the reticle of FIG. 5 to form a via shorting the primary and secondary voltage rails of the second devices with disabled power gating modules.

FIG. 6 is a top view of an exemplary power-gating-shorted device 320 illustrating how the power gating may be shorted using a via layer in one embodiment. The device 320 includes lines 360 for the secondary voltage rail 120 in an underlying metal layer and an intersecting line 370 for the primary voltage rail 110 and lines 380 for the secondary voltage rail 120 in an upper metal layer. In addition to vias 390 coupling the lines 360 and 380 for the secondary voltage rail 120, vias 400 are provided to couple the lines 360 and lines 390, thereby shorting the primary voltage rail 110 to the secondary voltage rail 120. The vias 400 may be defined by the second die pattern 350 in the reticle for manufacturing the power-gating-shorted devices 320, while the first die pattern 340 would not include the vias 400.

Figure 7:
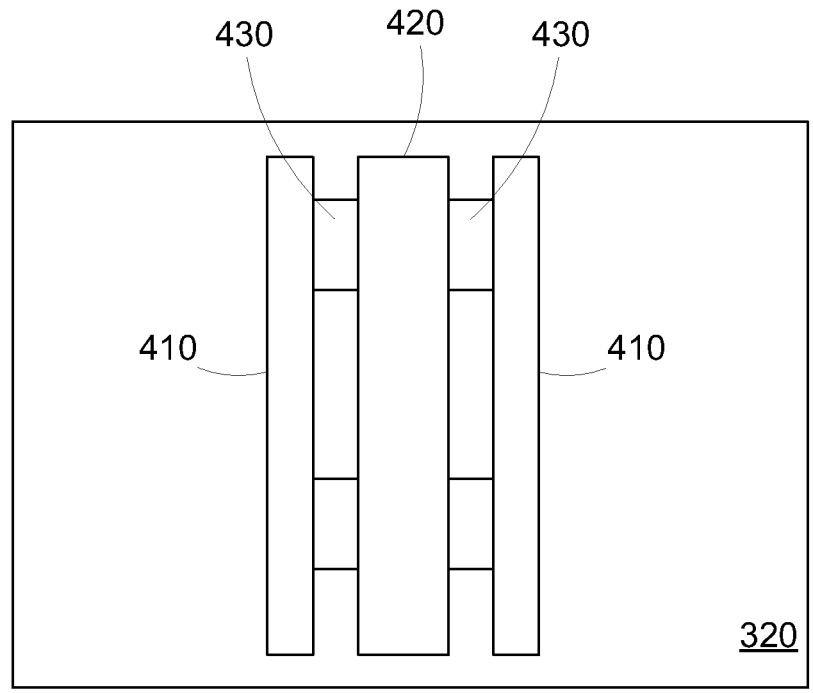
FIG. 7 is a top view of a semiconductor device patterned by the reticle of FIG. 5 to form a line shorting the primary and secondary voltage rails of the second devices with disabled power gating modules.

FIG. 7 is a top view of an exemplary power-gating-shorted device 320 illustrating how the power gating may be shorted using a line layer in another embodiment. The device 320 includes lines 410 for the primary voltage rail 110 and a line 420 for the secondary voltage rail 120 in the same metallization layer. Interlayer shorting lines 430 are provided to couple to the lines 410 to the lines 420, thereby shorting the primary voltage rail 110 to the secondary voltage rail 120. The shorting lines 430 may be defined by the second die pattern 350 in the reticle for manufacturing the power-gating-shorted devices 320, while the first die pattern 340 would not include the shorting lines 430.

Using the reticle 300 shown in FIG. 5, provides advantages for the silicon testing phase. If the power-gating scheme has a fundamental problem, silicon evaluation/debug is not held up, as the testing can proceed on the devices without power gating. The approach will provide the ability for designers to quickly isolate issues that are power-gating related, and will also provide good silicon data on the cost of power-gating for the particular implementation. The need for additional reticles and their associated costs is obviated, and separate mask sets do not have to be tracked throughout the fabrication facility. The power-gated shorted silicon receives the same processing as the power-gated silicon, and the die may be differentiated electrically through manufacturing bits. The use of the reticle 300 allows the devices 320, 330 to be manufactured next to one another on a wafer, thereby mitigating any wafer-to-wafer variation issues. Side-by-side manufacturing also allows the characterization of performance loss due to the power-gating implementation that could help determine if power-gating improvement could yield better device performance.

Figure 8:
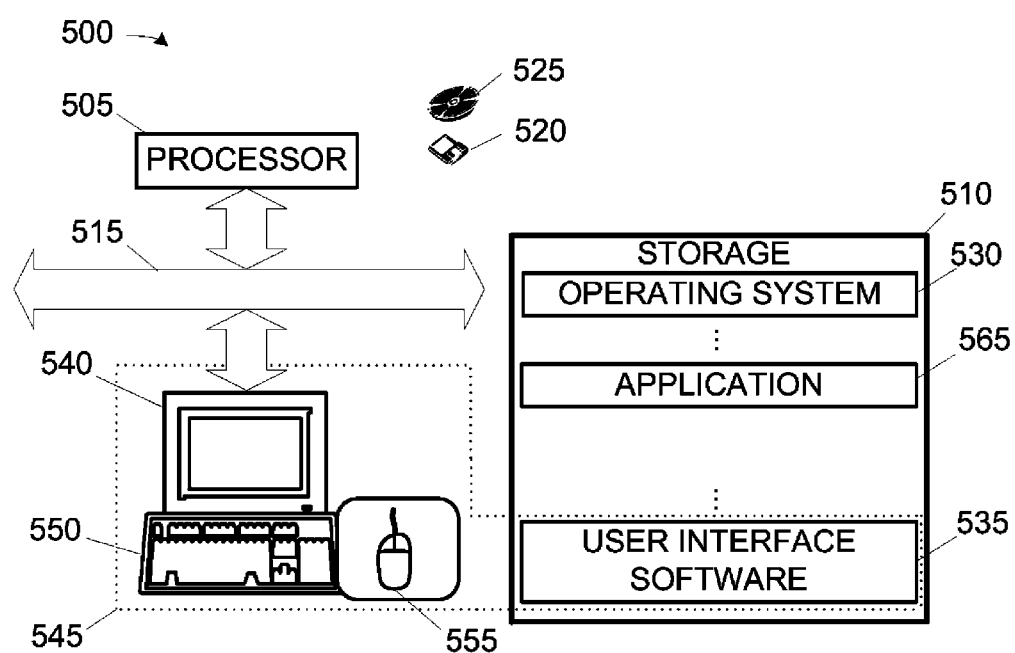
FIG. 8 is a simplified diagram of a computing apparatus that may be programmed to direct the fabrication of the power gating module of FIG. 1.

FIG. 8 illustrates a simplified diagram of selected portions of the hardware and software architecture of a computing apparatus 500 such as may be employed in some aspects of the present subject matter. The computing apparatus 500 includes a processor 505 communicating with storage 510 over a bus system 515. The storage 510 may include a hard disk and/or random access memory ("RAM") and/or removable storage, such as a magnetic disk 520 or an optical disk 525. The storage 510 is also encoded with an operating system 530, user interface software 535, and an application 565. The user interface software 535, in conjunction with a display 540, implements a user interface 545. The user interface 545 may include peripheral I/O devices such as a keypad or keyboard 550, mouse 555, etc. The processor 505 runs under the control of the operating system 530, which may be practically any operating system known in the art. The application 565 is invoked by the operating system 530 upon power up, reset, user interaction, etc., depending on the implementation of the operating system 530. The application 565, when invoked, performs a method of the present subject matter. The user may invoke the application 565 in conventional fashion through the user interface 545. Note that although a stand-alone system is illustrated, there is no need for the data to reside on the same computing apparatus 500 as the application 565 by which it is processed. Some embodiments of the present subject matter may therefore be implemented on a distributed computing system with distributed storage and/or processing capabilities.

It is contemplated that, in some embodiments, different kinds of hardware descriptive languages (HDL) may be used in the process of designing and manufacturing very large scale integration circuits (VLSI circuits), such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., storage 510, disks 520, 525, solid state storage, and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into the computing apparatus 500, and executed by the processor 505 using the application 565, which may then control, in whole or part, the operation of a semiconductor manufacturing facility (or fab) to create semiconductor products and devices. For example, in one embodiment, silicon wafers containing the power module 100 may be created using the GDSII data (or other similar data).

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A semiconductor device, comprising:
   a common primary voltage rail for providing a first positive voltage;
   a common secondary voltage rail for providing a second positive voltage for powering at least one device coupled to the common secondary voltage rail;
   a plurality of transistors coupled between the common primary and secondary voltage rails; and
   control logic operable to enable a first subset of the plurality of transistors to couple the common primary voltage rail to the common secondary voltage rail to generate the second positive voltage from the first positive voltage, wherein during a steady state condition, the first subset comprises less than all of the plurality of transistors.

2. The semiconductor device of claim 1, wherein the control logic is operable to enable a second subset of the plurality of transistors during a transient powering-up of the common secondary voltage rail, the second subset being different than the first subset.

3. The semiconductor device of claim 1, wherein the control logic is operable to assert individual enable signals for each of the transistors in the first subset responsive to receiving a global enable signal.

4. The semiconductor device of claim 3, wherein the control logic is operable to enable a second subset of the plurality of transistors during a transient powering-up of the common secondary voltage rail and enable the first subset after the transient powering-up of the common secondary voltage rail, the second subset being different than the first subset.

5. The semiconductor device of claim 4, wherein the control logic is operable to enable the first subset a predetermined time period after enabling the second subset.

6. The semiconductor device of claim 4, wherein the control logic is operable to enable the first subset after a voltage on the common secondary voltage rail exceeds a predetermined threshold.

7. The semiconductor device of claim 1, wherein the control logic is operable to enable a second subset of the plurality of transistors during a transient powering-up of the common secondary voltage rail responsive to receiving a first enable signal and enable the first subset after the transient powering-up of the common secondary voltage rail responsive to receiving a second enable signal.

8. The semiconductor device of claim 1, wherein each of the plurality of transistors has a different size.

9. A computer system, comprising:
   a host processor;
   memory coupled to the host processor;
   a power supply; and
   a circuit comprising a plurality of transistors coupled between a common primary voltage rail for providing a first positive voltage and a common secondary voltage rail operable to provide a second positive voltage for powering at least one device coupled to the common secondary voltage rail and control logic operable to enable a first subset of the plurality of transistors to couple the common primary voltage rail to the common secondary voltage rail to generate the second positive voltage from the first positive voltage, wherein during a steady state condition, the first subset comprises less than all of the plurality of transistors.

10. The system of claim 9, wherein the host processer comprises the circuit.

11. The system of claim 9, further comprising a graphics processing unit coupled to the power supply, wherein the graphics processing unit comprises the circuit.

12. The system of claim 9, wherein the host processor is operable to assert an enable signal, and the control logic is operable to enable the first subset responsive to the assertion of the enable signal.

13. The system of claim 9, wherein the control logic is operable to enable a second subset of the plurality of transistors during a transient powering-up of the common secondary voltage rail, the second subset being different than the first subset.

14. A method, comprising:
providing a plurality of transistors coupled between a common primary voltage rail operable to provide a first positive voltage and a common secondary voltage rail operable to provide a second positive voltage for powering at least one device coupled to the common secondary voltage rail; and
enabling a first subset of the plurality of transistors to couple the common primary voltage rail to the common secondary voltage rail to generate the second positive voltage from the first positive voltage, wherein during a steady state condition, the first subset comprises less than all of the plurality of transistors.

15. The method of claim 14, further comprising enabling a second subset of the plurality of transistors during a transient powering-up of the common secondary voltage rail, the second subset being different than the first subset.

16. The method of claim 14, further comprising asserting individual enable signals for each of the transistors in the first subset responsive to receiving a global enable signal.

17. The method of claim 16, further comprising enabling a second subset of the plurality of transistors during a transient powering-up of the common secondary voltage rail and enabling the first subset after the transient powering-up of the common secondary voltage rail, the second subset being different than the first subset.

18. The method of claim 17, further comprising enabling the first subset a predetermined time period after enabling the second subset.

19. The method of claim 12, further comprising enabling the first subset after a voltage on the common secondary voltage rail exceeds a predetermined threshold.

20. The method of claim 14, further comprising:
enabling a second subset of the plurality of transistors during a transient powering-up of the common secondary voltage rail responsive to receiving a first enable signal; and
enabling the first subset after the transient powering-up of the common secondary voltage rail responsive to receiving a second enable signal.

21. The method of claim 14, wherein each of the plurality of transistors has a different size.

22. A method for characterizing a semiconductor device including a primary voltage rail, a secondary voltage rail, a plurality of transistors coupled between the primary and secondary voltage rails, and control logic operable to enable selected ones of the plurality of transistors to couple the primary voltage rail to the secondary voltage rail, comprising:
setting a configuration of the control logic to enable a first subset of the transistors responsive to an enable signal;
determining a performance parameter of the semiconductor device in the first configuration;
iteratively changing the configuration to enable different subsets of the transistors and determining the performance parameter for the changed configurations to determine an effect of the configurations on the performance parameter; and
setting the configuration to a selected configuration that optimizes the performance parameter.

23. The method of claim 22, wherein the configuration is associated with a transient powering-up of the secondary voltage rail.

24. The method of claim 22, wherein the configuration is associated with a steady state operation of the secondary voltage rail.

25. A reticle, comprising:
a first die pattern for patterning a first interconnect structure of a first semiconductor device including a primary voltage rail, a secondary voltage rail, and a plurality of transistors coupled between the primary and secondary voltage rails, wherein the first interconnect structure is associated with at least one of the primary or secondary voltage rails; and
a second die pattern disposed adjacent the first die pattern for patterning a second interconnect structure of a second semiconductor device including a second primary voltage rail, a second secondary voltage rail, and a second plurality of transistors coupled between the second primary and second secondary voltage rails, wherein the second interconnect structure defines a short circuit connection between the second primary and second secondary voltage rails.

26. The reticle of claim 25, wherein the second interconnect structure comprises a via.

27. The reticle of claim 25, wherein the second interconnect structure comprises a line.

28. A method, comprising:
forming a first semiconductor device on a wafer, the first semiconductor device including a first primary voltage rail, a first secondary voltage rail, and a first power gating module coupled between the first primary and secondary voltage rails;
forming a second semiconductor device on the wafer, the second semiconductor device including a second primary voltage rail, a second secondary voltage rail, and a second power gating module coupled between the second primary and secondary voltage rails; and
patterning the wafer to short the second primary voltage rail to the second secondary voltage rail.

29. The method of claim 28, further comprising patterning the wafer using a reticle having a first exposure pattern for forming an interconnect structure on the first semiconductor device and a second exposure pattern for shorting the second primary voltage rail to the second secondary voltage rail in the second semiconductor device.

30. The method of claim 28, wherein patterning the wafer to short the second primary voltage rail to the second secondary voltage rail comprises patterning a via connecting the second primary voltage rail to the second secondary voltage rail.

31. The method of claim 28, wherein patterning the wafer to short the second primary voltage rail to the second secondary voltage rail comprises patterning a line connecting the second primary voltage rail to the second secondary voltage rail.

32. The method of claim 28, further comprising:
determining a first performance characteristic of the first semiconductor device;

determining a second performance characteristic of the second semiconductor device; and comparing the first and second performance characteristics to characterize an effect of the first power gating module on the first performance characteristic.

33. A computer readable storage device encoded with data that, when implemented in a manufacturing facility, adapts the manufacturing facility to create an apparatus, comprising:

a common primary voltage rail for providing a first positive voltage;

a common secondary voltage rail for providing a second positive voltage for powering at least one device coupled to the common secondary voltage rail;

a plurality of transistors coupled between the common primary voltage rail and the common secondary voltage rail; and control logic operable to enable a first subset of the plurality of transistors to couple the common primary voltage rail to the common secondary voltage rail to generate the second positive voltage from the first positive voltage, wherein during a steady state condition, the first subset comprises less than all of the plurality of transistors.

34. The computer readable storage device of claim 33, encoded with data that, when implemented in the manufacturing facility, adapts the manufacturing facility to create the apparatus, wherein the control logic is operable to enable a second subset of the plurality of transistors during a transient powering-up of the common secondary voltage rail, the second subset being different than the first subset.

35. The computer readable storage device of claim 33, encoded with data that, when implemented in the manufacturing facility, adapts the manufacturing facility to create the apparatus, wherein the control logic is operable to assert individual enable signals for each of the transistors in the first subset responsive to receiving a global enable signal, and the control logic is operable to enable a second subset of the plurality of transistors during a transient powering-up of the common secondary voltage rail and enable the first subset after the transient powering-up of the common secondary voltage rail, the second subset being different than the first subset.

36. The computer readable storage device of claim 33, encoded with data that, when implemented in the manufacturing facility, adapts the manufacturing facility to create the apparatus, wherein the control logic is operable to enable a second subset of the plurality of transistors during a transient powering-up of the common secondary voltage rail responsive to receiving a first enable signal and enable the first subset after the transient powering-up of the common secondary voltage rail responsive to receiving a second enable signal.

37. The computer readable storage device of claim 33, encoded with data that, when implemented in the manufacturing facility, adapts the manufacturing facility to create the apparatus, wherein each of the plurality of transistors has a different size.

* * * * *